US012766766B2

(12) United States Patent
Okumura et al.

(10) Patent No.: US 12,766,766 B2
(45) Date of Patent: Oct. 20, 2026

(54) MOLDING DEVICE AND MOLDING METHOD

(71) Applicant: KAWASAKI JUKOGYO KABUSHIKI KAISHA, Kobe (JP)

(72) Inventors: Kenshiro Okumura, Kobe (JP); Takaya Hamamoto, Kobe (JP); Sayaka Ochi, Kobe (JP); Naoki Shimada, Kobe (JP); Akio Kawamata, Kobe (JP); Yuya Ouchi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 94 days.

(21) Appl. No.: 18/408,637

(22) Filed: Jan. 10, 2024

(65) Prior Publication Data

US 2024/0149503 A1 May 9, 2024

Related U.S. Application Data

(63) Continuation of application No. PCT/JP2022/027370, filed on Jul. 12, 2022.

(30) Foreign Application Priority Data

Jul. 13, 2021 (JP) ................................ 2021-115704

(51) Int. Cl.

*B29C 43/14* (2006.01)
*B29C 43/52* (2006.01)
*B29L 31/30* (2006.01)

(52) U.S. Cl.

CPC .............. *B29C 43/14* (2013.01); *B29C 43/52* (2013.01); *B29C 2043/142* (2013.01); *B29C 2043/522* (2013.01); *B29L 2031/3082* (2013.01)

(58) Field of Classification Search

CPC ... B29C 43/14; B29C 43/52; B29C 2043/142; B29C 2043/522; B29C 33/34;

(Continued)

(56) References Cited

U.S. PATENT DOCUMENTS 10,029,426 B2 7/2018 Jessrang
2012/0100339 A1* 4/2012 Haynes ................ B29C 48/001 264/165

(Continued)

FOREIGN PATENT DOCUMENTS

JP 2006255923 A 9/2006
JP 2017154409 A 9/2017

(Continued)

OTHER PUBLICATIONS

English translation of WO-2019172208-A1 by EPO. (Year: 2019).*

*Primary Examiner* — Inja Song
(74) *Attorney, Agent, or Firm* — XSENSUS LLP

(57) ABSTRACT

A molding device includes: a lower mold that supports a workpiece containing a thermoplastic resin and that is heated to a first predetermined temperature; an upper mold that is opposed to the lower mold, that presses the workpiece, and that is heated to a second predetermined temperature; a transferer that moves the lower mold and the upper mold relative to each other in a transfer direction of the workpiece; and control circuitry. The lower mold includes temperature-controlled regions adjacent to one another in the transfer direction, the temperature-controlled regions including a first lower mold temperature-controlled region and a second lower mold temperature-controlled region having a temperature lower than a temperature of the first lower mold temperature-controlled region. The control circuitry changes proportions of the first and second lower mold temperature-controlled regions in the lower mold as a (Continued)

function of a relative position between the upper and lower molds.

9 Claims, 9 Drawing Sheets

(58) Field of Classification Search
CPC . B29C 43/04; B29C 2043/3613; B29C 43/34; B29C 43/36; B29C 2043/5816; B29C 2043/5875; B29C 33/02; B29C 43/58; B29C 70/42; B29L 2031/3082
See application file for complete search history.

(56) References Cited

U.S. PATENT DOCUMENTS

| | | | | |
|---|---|---|---|---|
| 2015/0197039 | A1* | 7/2015 | Matsuzuki | C03B 11/125 264/297.7 |
| 2015/0328829 | A1* | 11/2015 | Jessrang | B29C 43/06 156/583.1 |
| 2016/0361846 | A1 | 12/2016 | Backhaus et al. | |
| 2017/0043507 | A1* | 2/2017 | Göbel | B29C 49/4823 |
| 2018/0215083 | A1* | 8/2018 | Halford | B29C 33/04 |
| 2019/0118488 | A1* | 4/2019 | Kamihara | B29C 70/40 |
| 2020/0078990 | A1 | 3/2020 | Sana | |
| 2020/0298500 | A1* | 9/2020 | Koehn | B29C 66/1122 |
| 2022/0009178 | A1 | 1/2022 | Harada et al. | |
| 2023/0249384 | A1* | 8/2023 | Charest | B29C 43/22 264/1.28 |

FOREIGN PATENT DOCUMENTS

| | | | | |
|---|---|---|---|---|
| JP | 2018-089825 A | | 6/2018 | |
| JP | 6766268 B1 | | 10/2020 | |
| WO | WO-2019172208 A1 | * | 9/2019 | B29C 70/16 |

* cited by examiner

MOLDING DEVICE AND MOLDING METHOD

CROSS-REFERENCE TO RELATED APPLICATIONS

The present application is a bypass continuation of PCT Filing PCT/JP2022/027370, filed Jul. 12, 2022, which claims priority to JP2021-115704, filed Jul. 13, 2021, both of which are incorporated by reference in their entirety.

BACKGROUND

1. Field

The present disclosure relates to a device and method for molding a workpiece including a thermoplastic composite.

2. Background Art

Conventionally, aircraft fuselage panels, i.e., skin panels, are produced by combining elongated panels each of which has a length of several meters and which are divided circumferentially and longitudinally from one another because this way of production is advantageous in terms of ease of molding and ease of assembly. In recent years, thermoplastic composites (CFRTPs) have been used as the material of skin panels. Examples of molding methods for producing elongated panels made of thermoplastic composites include autoclave molding and press molding.

Autoclave molding of thermoplastic composites involves consolidation at a high temperature, e.g., 400° C., and for this reason there are few auxiliary materials that can be used in the autoclave molding. "Consolidation" refers to molding under heat and pressure. Moreover, the time taken for the consolidation is so long that it is difficult to shorten the production time. In addition, the autoclave molding requires high energy cost.

Press molding is generally unfit for producing elongated panels because of limitations on the press dimensions. Even with the use of CCM (Continuous Compression Molding) known as a technique for continuous molding of thermoplastic composites, it is difficult to press a large-sized panel or a panel with a varying cross-section.

U.S. Pat. No. 10,029,426 aims to solve the above problem of press molding. In this literature, an elongated panel is produced by a molding method that includes placing a stack of prepregs into an elongated press mold and repeating consolidation and longitudinal movement of the mold. However, in this method, the step of cooling the consolidated panel is performed by natural cooling in which the panel is exposed to atmosphere, and consolidation of the entire panel and cooling of the parts of the panel are carried out as different steps separate from each other. Thus, much time is required to complete the molding process.

SUMMARY

A molding device of the present disclosure includes: a lower mold that supports a workpiece containing a thermoplastic resin and that is heated to a predetermined temperature; an upper mold that is opposed to the lower mold, that presses the workpiece, and that is heated to a predetermined temperature; a transferer that moves the lower mold and the upper mold relative to each other in a transfer direction of the workpiece; and control circuitry, wherein the lower mold includes temperature-controlled regions adjacent to one another in the transfer direction, the temperature-controlled regions including a first lower mold temperature-controlled region and a second lower mold temperature-controlled region having a temperature lower than a temperature of the first lower mold temperature-controlled region, and the control circuitry changes proportions of the first lower mold temperature-controlled region and the second lower mold temperature-controlled region in the lower mold as a function of a relative position between the upper mold and the lower mold.

DETAILED DESCRIPTION

Hereinafter, a molding device and a molding method according to one embodiment of the present disclosure will be described with reference to the drawings. The molding device and molding method described below are merely an exemplary embodiment of the present disclosure. The present disclosure is not limited to the embodiment described below, and additions, deletions, and changes may be made without departing from the gist of the present disclosure.

Figures 1A, 1B, 1C:
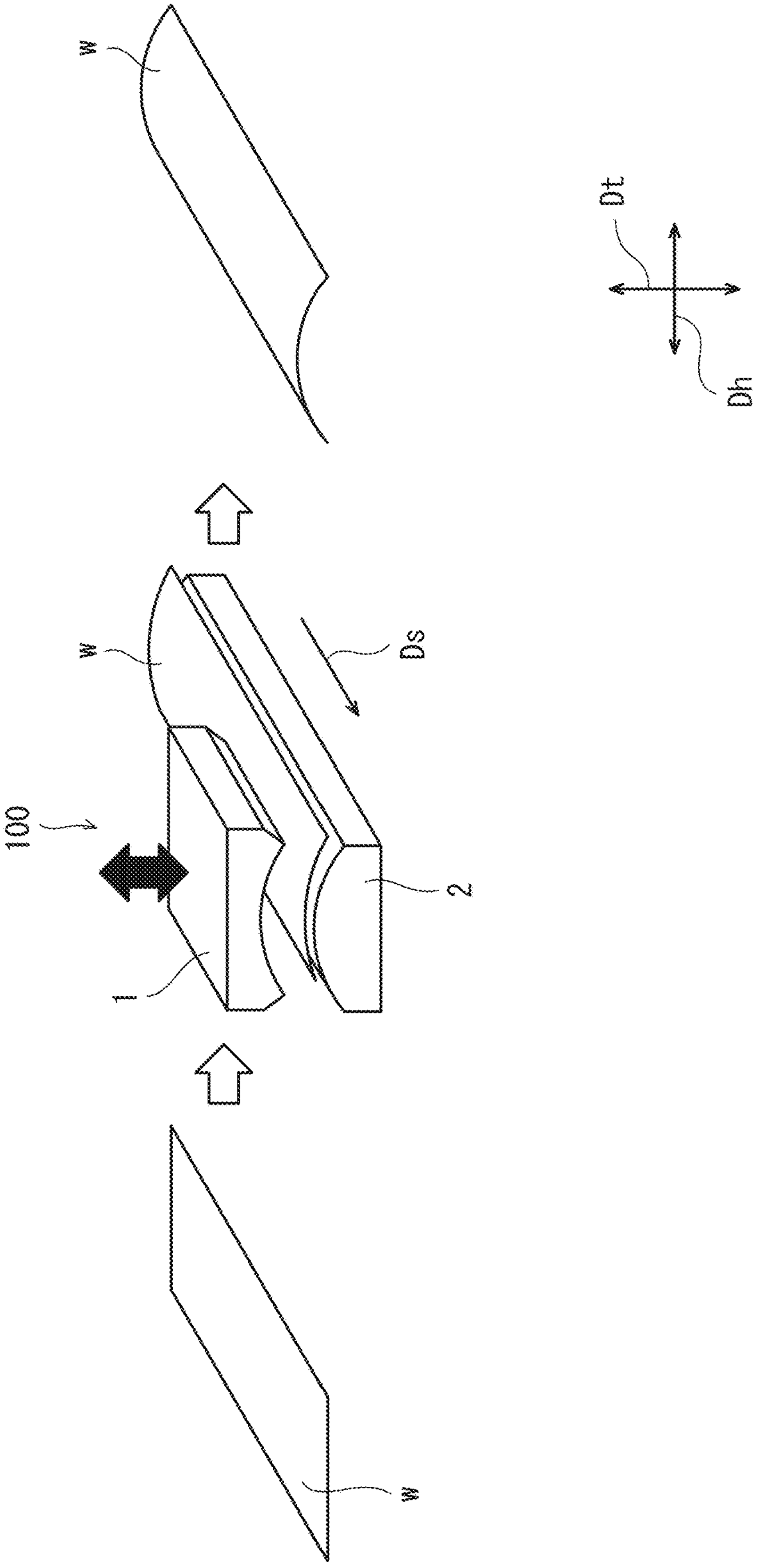
FIG. 1A is a perspective view showing a workpiece.
FIG. 1B is a schematic perspective view showing a molding device for molding the workpiece of FIG. 1A.
FIG. 1C is a perspective view showing a molded workpiece.

FIG. 1A is a perspective view showing a workpiece w. FIG. 1B is a schematic perspective view showing a molding device 100 for molding the workpiece w of FIG. 1A. FIG. 1C is a perspective view showing a skin panel, i.e., aircraft fuselage panel, as the molded workpiece w.

The molding device 100 of the present embodiment, which is shown in FIG. 1B, is a device for a molding process in which the sheet-shaped workpiece w as shown in FIG. 1A is bent in the thickness direction of the workpiece w in a manner as shown in FIG. 1C. In the present embodiment, the workpiece w is a prepreg stack prepared in advance and including prepregs composed of carbon fibers impregnated with a thermoplastic resin.

Each of the prepregs is an intermediate material composed of fibers impregnated with a resin. The prepregs are stacked on top of one another to form a stack, which is then subjected to steps such as consolidation to produce a fiber-reinforced plastic (FRP). The fiber-reinforced plastic subjected to molding in this example is a carbon fiber-reinforced thermoplastic composite (CFRTP).

As shown in FIG. 1B, the molding device 100 of the present embodiment includes an upper mold 1 and a lower mold 2. The lower surface of the upper mold 1 is concave. The upper surface of the lower mold 2 is convex to fit closely to the lower surface of the upper mold 1. The workpiece w is molded while being transferred in a transfer direction Ds by relative movement between the upper mold 1 and the lower mold 2. Specifically, the workpiece w placed on the lower mold 2 is transferred to a predetermined position in the transfer direction Ds, and at the predetermined position the upper mold 1 moves downward to press the workpiece w. After that, the upper mold 1 is raised, and the workpiece w is transferred by the above-mentioned relative movement to a next predetermined position in the transfer direction Ds and pressed by the upper mold 1 at the predetermined position. In this manner, the molding device 100 repeats the cycle consisting of transferring the workpiece w and pressing the workpiece w. As a result, the workpiece w as shown in FIG. 1C is obtained. The workpiece w has a curved shape extending continuously in the longitudinal direction of the workpiece w. Hereinafter, the method for molding the workpiece w will be described in detail. Throughout the subsequent description and drawings, a direction which is perpendicular to the transfer direction Ds and in which the workpiece w placed on the lower mold 2 extends is defined as a width direction Dh, and a direction perpendicular to both the transfer direction Ds and the width direction Dh is defined as a height direction Dt.

In the present embodiment, the relative movement between the upper mold 1 and the lower mold 2 is effected by moving the lower mold 2. The present disclosure encompasses embodiments in which the relative movement is effected by moving the upper mold 1. In the present embodiment, as described above, the mold on which the workpiece w is placed is the lower mold 2, and the opposite mold is the upper mold 1. The terms "upper" and "lower" are merely used for the sake of convenience, and the direction in which the molds face each other need not coincide with the gravity direction and may be any direction that does not depart from the gist of the present disclosure.

Figure 2:
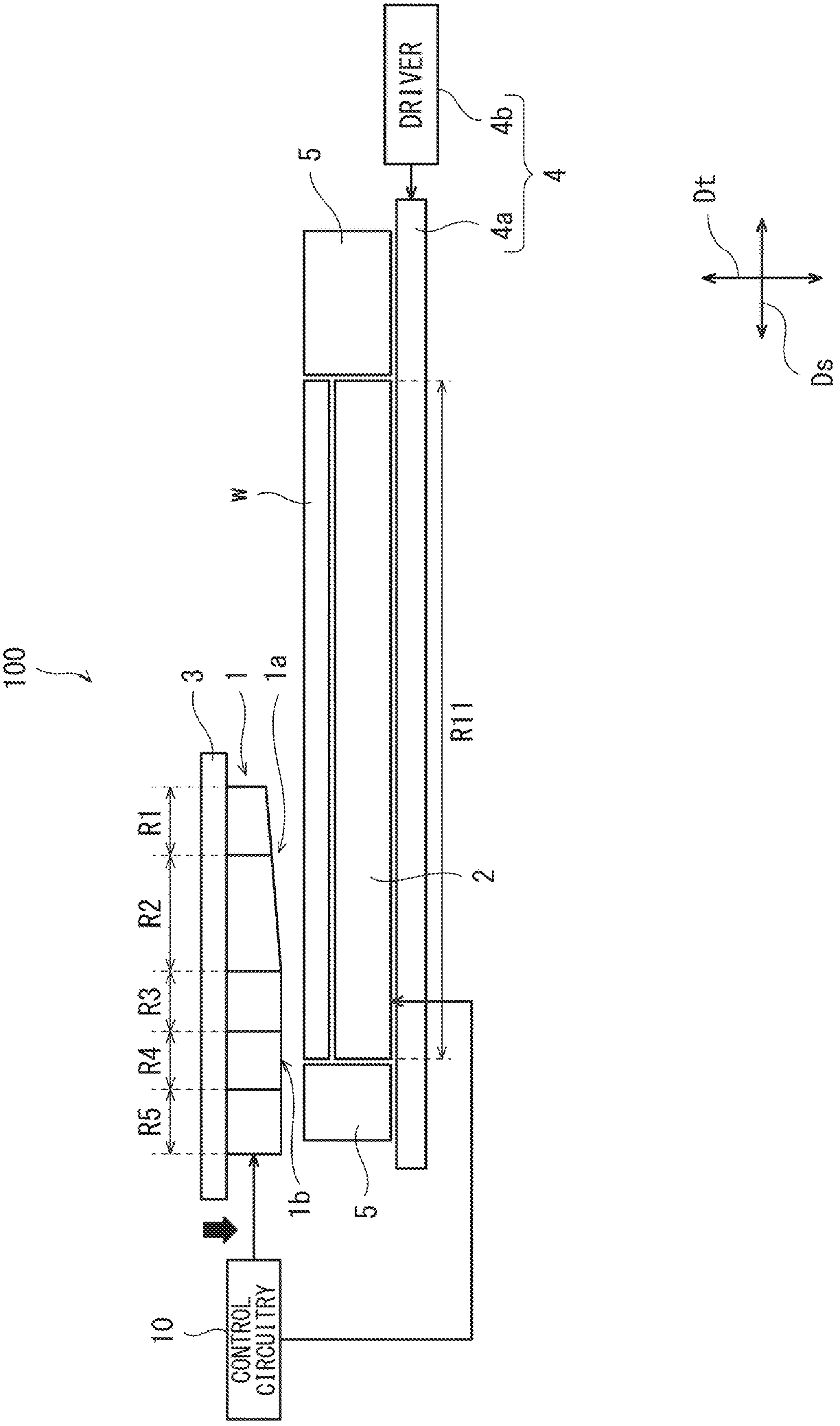
FIG. 2 shows the configuration of a molding device according to one embodiment of the present application.
Figure 3:
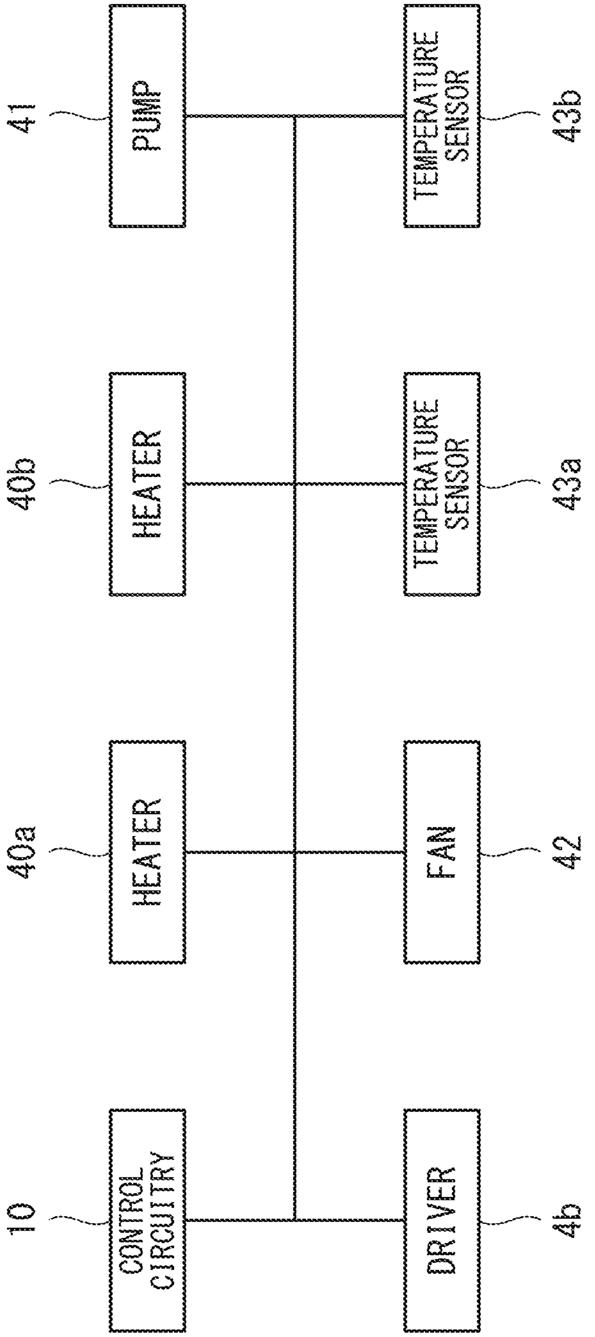
FIG. 3 is a block diagram showing the configuration of a control system in the molding device.

FIG. 2 shows the configuration of the molding device 100 according to the present embodiment. FIG. 3 is a block diagram showing the configuration of a control system in the molding device 100. As shown in FIG. 2, the molding device 100 includes an upper mold support 3, a transferer 4, pressure-receiving plates 5, and control circuitry 10 in addition to the upper and lower molds 1 and 2 described above.

The control circuitry 10 in the present disclosure may be implemented using circuitry or processing circuitry which includes general purpose processors, special purpose processors, integrated circuits, ASICs (Application Specific Integrated Circuits), conventional circuitry and/or combinations thereof which are configured or programmed to perform the disclosed functionality. Processors are considered processing circuitry or circuitry as they include transistors and other circuitry therein. In the present disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The lower mold 2 is, for example, rectangular in plan. The lower mold 2 is heated to a predetermined temperature and supports the workpiece w. In the present embodiment, the melting point Tm of the workpiece w may be, but is not limited to, 305° C. The lower mold 2 is heated to a temperature lower than the melting point Tm of the workpiece w. In this example, the lower mold 2 is heated to a predetermined temperature T11. The predetermined temperature T11 may be, but is not limited to, 300° C. Any suitable temperature may be used as the predetermined temperature T11 depending on the melting point Tm of the workpiece w, and the value of the predetermined temperature T11 is chosen, for example, in the range of Tm±10° C. The temperature of the lower mold 2 is detected by a temperature sensor 43*b* such as a thermocouple or an infrared camera. Heaters 40*b* are located within the lower mold 2. For example, 12 heaters 40*b* are located in the longitudinal direction of the workpiece w, namely, in the transfer direction Ds. The heaters 40*b* are not limited to this arrangement and number.

For example, four heaters 40*b* are located in the width direction Dh perpendicular to the transfer direction Ds. Thus, the number of control channels through which the control circuitry 10 controls the heaters 40*b* for the lower mold 2, i.e., the total number of the heaters 40*b*, is 48. The heating by the heaters 40*b* is controlled by the control circuitry 10 to adjust the temperature of the lower mold 2. During the process of molding of the workpiece w, the temperature of the lower mold 2 is controlled by the above configuration such that the lower mold 2 has two temperature-controlled regions, one of which is a temperature-controlled region R11 controlled to the predetermined temperature T11 and the other of which is a temperature-controlled region R12 adjusted to a temperature T12 lower than the predetermined temperature T11. The temperature-controlled region R11 is first lower mold temperature-controlled region. The temperature-controlled region R12 is second lower mold temperature-controlled region. The length of the lower mold 2 in the transfer direction Ds may be, but is not limited to, 2500 mm.

The upper mold 1 is supported by the upper mold support 3. The upper mold 1 moves upward and downward in the height direction Dt. The upper mold 1 is opposed to the lower mold 2. The upper mold 1 presses the workpiece w. The upper mold 1 includes temperature-controlled regions. The temperature-controlled regions are adjacent to one another in the transfer direction Ds and whose temperatures are controlled independently of one another by the control circuitry 10. During molding of the workpiece w, the control circuitry 10 controls the temperatures of the temperature-controlled regions adjacent to one another in the transfer direction Ds to different temperatures.

Specifically, as shown in FIG. 2, the upper mold 1 includes five temperature-controlled regions R1, R2, R3, R4, and R5. The temperature-controlled regions R1 to R5 are adjacent to one another in the transfer direction Ds. Heaters 40*a* are located within the upper mold 1, and at least one heater 40*a* is located for each temperature-controlled region. The heating of the upper mold 1 by the heaters 40*a* is controlled by the control circuitry 10. In the present embodiment, for example, the heaters 40*a* are arranged such that in the transfer direction Ds of the workpiece w, one heater 40*a* is located in each of the temperature-controlled regions R1, R3, R4, and R5 and two heaters 40*a* are located in the temperature-controlled region R2. In the width direction Dh, for example, four heaters 40*a* are located in each of the temperature-controlled regions. Since, as described above, six heaters 40*a* are located in the transfer direction Ds of the workpiece w and four heaters 40*a* are located in the width direction Dh of the workpiece w. As a result, the number of control channels through which the control circuitry 10 controls the heaters 40*a* for the upper mold 1, i.e., the total number of the heaters 40*a*, is 24. The arrangement and number of the heaters 40*a* and the number of the control channels are not limited to those described above.

The transferer 4 includes a base 4*a* and a driver 4*b*. The lower mold 2 and the pressure-receiving plates 5 are located on the base 4*a*. The pressure-receiving plates 5 are located on both ends of the lower mold 2 in the transfer direction Ds and on both ends of the lower mold 2 in the width direction Dh. The pressure-receiving plates 5 are in contact with the lower mold 2.

The driver 4*b* of the transferer 4 is controlled by the control circuitry 10 to transfer the base 4*a* supporting the lower mold 2 in the transfer direction Ds. The driver 4*b* may be, for example, a gear structure including a rack gear, a pinion gear, and an electric motor. In this case, the pinion gear connected to a rotating shaft of the electric motor rotates to move the rack gear located on the base 4*a* in the transfer direction Ds. Thus, the base 4*a* moves in the transfer direction Ds, and accordingly the lower mold 2 is moved in the transfer direction Ds. The transferer 4 and the driver 4*b* may take any other suitable forms as long as the transferer 4 and the driver 4*b* perform the above-described functions and do not impair the essence of the present disclosure. For example, the drive source of the driver 4*b* may be an internal combustion engine.

The control circuitry 10 controls the respective temperatures T1 to T5 of the temperature-controlled regions R1 to R5 such that the temperatures T1 to T5 are in descending order from upstream to downstream in the transfer direction Ds. Upstream to downstream in the transfer direction Ds are from right to left in FIG. 2. Specifically, the temperature T1 of the temperature-controlled region R1 is increased to a process temperature Tp, e.g., in the range of 350 to 400° C. The process temperature Tp is the highest of the temperatures of the regions R1 to R5. The process temperature Tp is a reference temperature for molding. The value of the process temperature Tp is chosen in view of the melting point Tm of the workpiece w. The process temperature Tp is not limited to the range mentioned above.

The temperature T2 of the temperature-controlled region R2 is set to a temperature lower than the temperature of the temperature-controlled region R1, and equal to or higher than the melting point Tm. The purpose of this setting of the temperature T2 of the temperature-controlled region R2 is to make it possible, when pressing the workpiece w by a downstream end of a preheating region 1*a* described later, to accomplish the pressing at a temperature at which the viscosity of the workpiece w begins to decrease. The temperatures T1 to T5 of the temperature-controlled regions R1 to R5 of the upper mold 1 are detected by temperature sensors 43*a*, just as the temperature of the lower mold 2 is detected by the temperature sensor 43*b*.

The temperatures T3 to T5 of the temperature-controlled regions R3, R4, and R5 of the upper mold 1 are set to satisfy the relationship T2>T3>T4>T5. The temperatures T3 to T5 may be set to, but are not limited to, temperatures ranging from 50 to 150° C. below the process temperature Tp. In the present embodiment, the length of the upper mold 1 in the transfer direction Ds is, for example, 1080 mm. The length of the upper mold 1 in the transfer direction Ds is not limited to 1080 mm. The lengths of the upper and lower molds 1 and 2 in the transfer direction Ds may be changed, for example, depending on the length of the workpiece w in the transfer direction Ds. The lengths of the temperature-controlled regions R1, R2, R3, R4, and R5 of the upper mold 1 in the transfer direction Ds and the number of such temperature-controlled regions are chosen depending on the lengths of the upper mold 1 and the workpiece w in the transfer direction Ds and in association with predetermined distances that the base 4*a* is moved in the transfer direction Ds.

The upper mold 1 includes a preheating region 1*a* and a downstream heating region 1*b*. The preheating region 1*a* is located on the upstream side in the transfer direction Ds. The downstream heating region 1*b* is located downstream of the preheating region 1*a* in the transfer direction Ds. In the present embodiment, the preheating region 1*a* extends over the temperature-controlled regions R1 and R2, and the downstream heating region 1*b* extends over the temperature-controlled regions R3, R4, and R5.

The preheating region 1*a* is located away from the workpiece w when the downstream heating region 1*b* is in contact with the workpiece w. That is, the thickness of the preheating region 1*a* in the height direction Dt is smaller than the thickness of the downstream heating region 1*b* in the height direction Dt. In other words, during molding of the workpiece w in the present embodiment, the temperature-controlled regions R1 and R2 of the upper mold 1 do not touch the workpiece w, while the temperature-controlled regions R3 to R5 perform intermittent repetition of contact with, and movement away from, the workpiece w. In the present embodiment, in order to be located away from the workpiece w, the preheating region 1*a* includes at least one horizontal surface, inclined surface, or curved surface that faces the workpiece w. FIG. 2 shows an example where the preheating region 1*a* includes an inclined surface that faces the workpiece w.

The foregoing has described the lengths of the temperature-controlled regions R1 to R5 in the transfer direction Ds, the temperatures T1 to T5 of the temperature-controlled regions R1 to R5, the temperature-controlled regions R11 and R12 of the lower mold, and the temperatures T11 and T12 of the temperature-controlled regions R11 and R12. In the present disclosure, it is preferable that at least the following requirements be met: the temperature of the entire preheating region 1*a* is set to a temperature equal to or higher than the melting point of the workpiece w, the temperature of the downstream heating region 1*b* is set to a temperature lower than the melting point of the workpiece w, and the temperature of the lower mold 2 is set to a temperature lower than the melting point of the workpiece w and equal to or higher than the temperature of the downstream heating region 1*b*. It has been experimentally established that in the present embodiment, dividing each of the preheating region 1*a* and the downstream heating region 1*b* into temperature-controlled regions set to different temperatures is effective to accelerate resin crystallization during consolidation of the workpiece w. The configuration described above is based on this experimentally established fact.

Figure 4A:
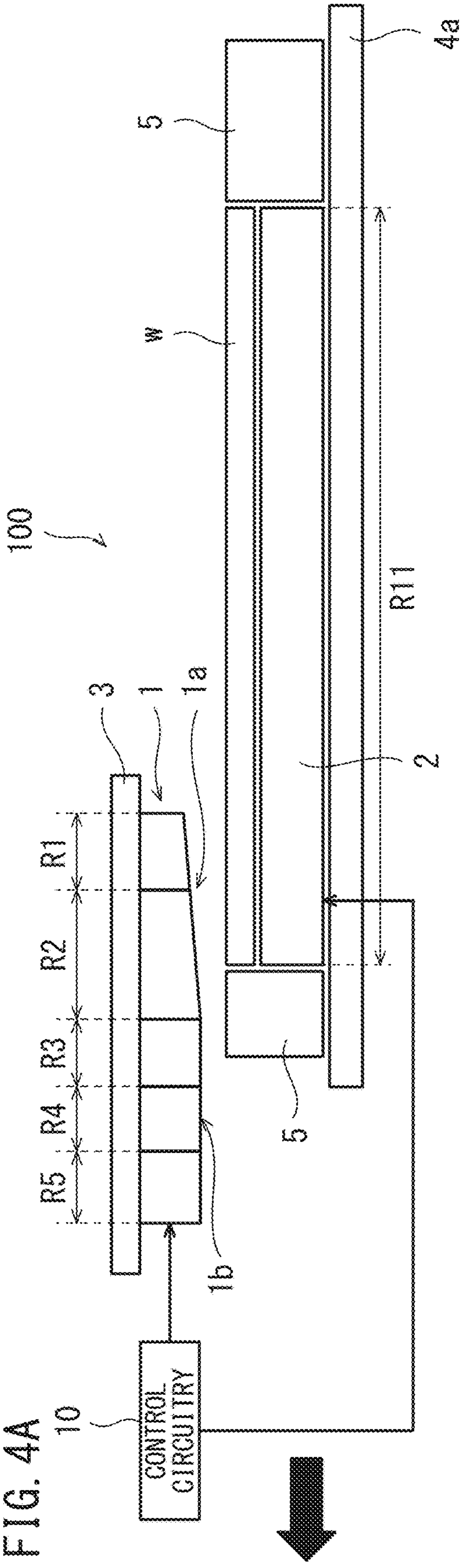
FIG. 4A is a view for explaining a preheating step.
Figure 4B:
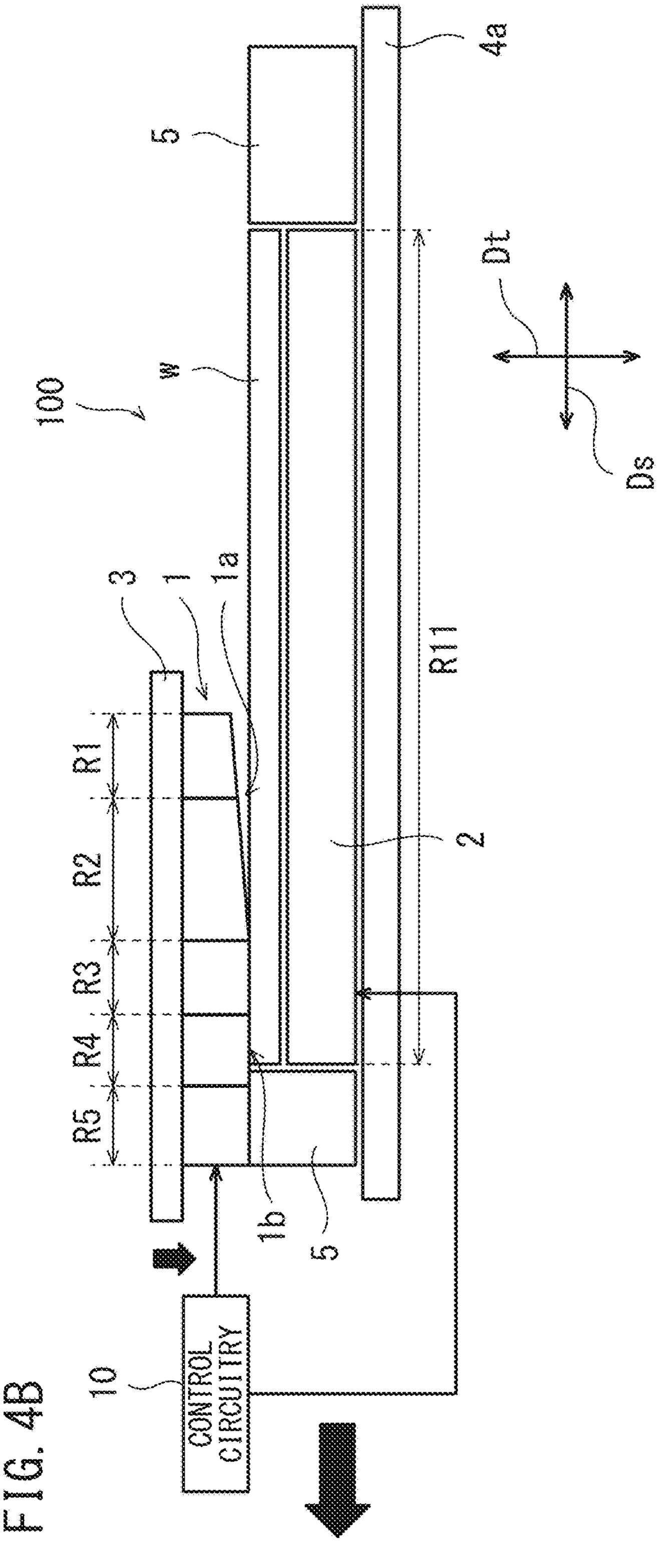
FIG. 4B is a view for explaining a first pressing step.
Figure 5A:
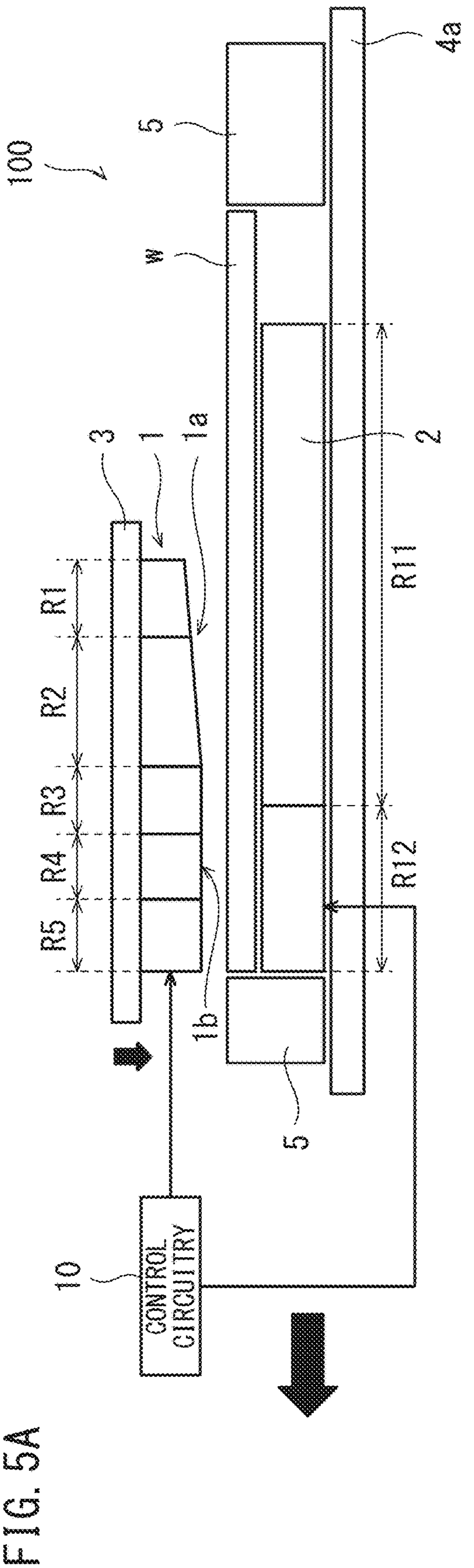
FIG. 5A is a view for explaining a moving step.
Figure 5B:
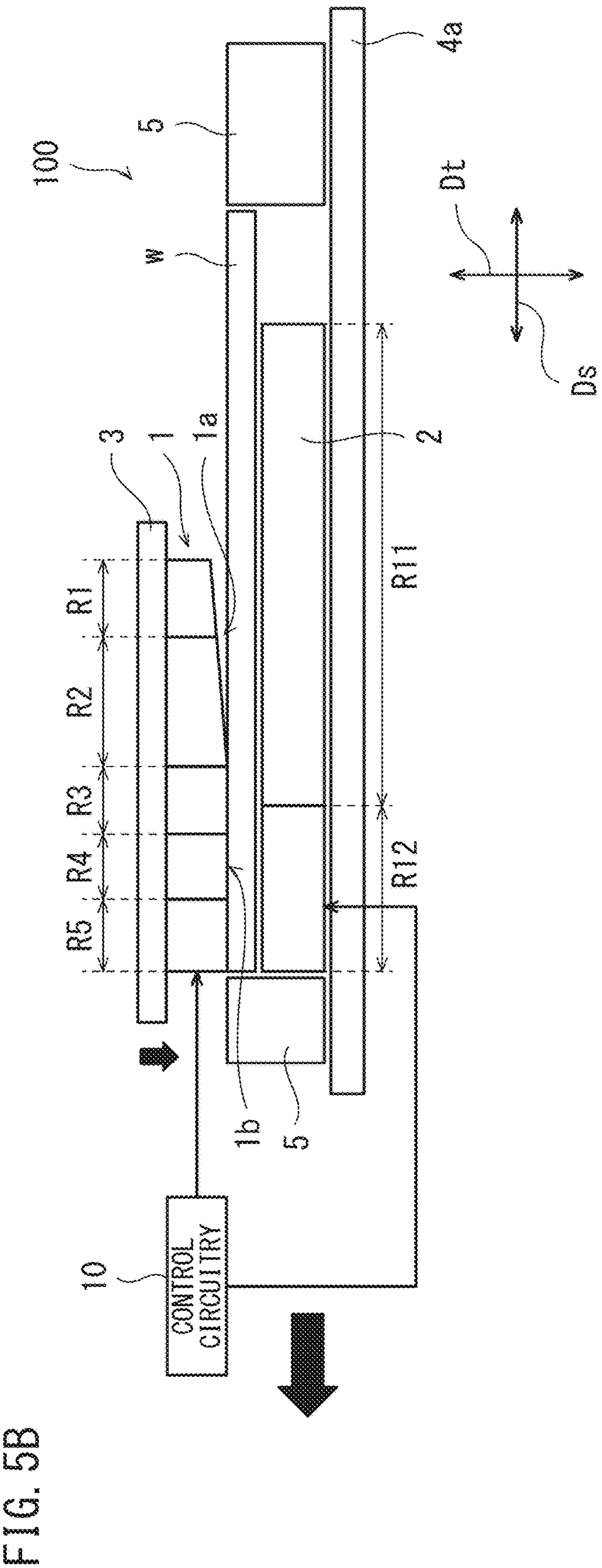
FIG. 5B is a view for explaining a second pressing step.

The steps of a molding method using the molding device 100 of the present embodiment will be individually described with reference to the drawings. FIG. 4A is a view for explaining a first preheating step of preheating the workpiece w. FIG. 4B is a view for explaining a first consolidation step. FIGS. 5A and 5B are views for explaining second and subsequent consolidation steps, transfer of the workpiece w, and the step of changing the proportions of the temperature-controlled regions in the lower mold 2. In FIGS. 4A, 4B, 5A, and 5B, as in FIG. 2, the upstream side in the transfer direction Ds is depicted on the right side, and the downstream side in the transfer direction Ds is depicted on the left side.

The step shown in FIG. 4A is as follows. First, the downstream end, left end in the figure, of the flat workpiece w is subjected to first preheating, namely, heating prior to pressing. In the first preheating, the downstream end of the workpiece w is heated while the preheating region 1*a* of the upper mold 1 is located away from the downstream end of the workpiece w. The preheating region 1*a* is portion of the upper mold 1 corresponding to the temperature-controlled regions R1 and R2. The heating increases the temperature of the downstream end of the workpiece w. At this stage, the lower mold 2 includes only the temperature-controlled region R11.

The next step shown in FIG. 4B is as follows. The base 4*a* is moved a predetermined distance in the transfer direction Ds. The movement distance is, for example, 1/10 of the length of the workpiece w in the transfer direction Ds. In conjunction with the movement of the base 4*a*, the workpiece w moves the predetermined distance in the transfer direction Ds. After that, the upper mold 1 is lowered to press the downstream end of the workpiece w. Specifically, the downstream end of the workpiece w is consolidated by the temperature-controlled region R3 of the upper mold 1 and the temperature-controlled region R11 of the lower mold 2. The pressing time may be, but is not limited to, 10 seconds or more. During the pressing, a portion, such as a middle portion, of the workpiece w that is upstream of the downstream end is located such that the portion as viewed in the height direction Dt of the preheating region 1*a* overlaps the preheating region 1*a*. Thus, in this step, that portion of the workpiece w which is upstream of the downstream end is preheated simultaneously with the pressing of the downstream end. During this step, the workpiece w and the preheating region 1*a* are not in contact because of the above-described shape of the upper mold 1. Thus, the preheating is effected by heat radiation of the preheating region 1*a* or by convection of air heated by the preheating region 1*a*.

The next step shown in FIG. 5A is as follows. The upper mold 1 is raised, and the base 4*a* is moved a predetermined distance in the transfer direction Ds. In conjunction with the movement of the base 4*a*, the workpiece w moves the predetermined distance in the transfer direction Ds. In this step, the lower mold 2 is controlled to shift from the state where the lower mold 2 includes only the temperature-controlled region R11 to the state where the lower mold 2 includes the temperature-controlled regions R11 and R12 adjacent to each other in the transfer direction Ds. The temperature-controlled region R12 is formed downstream of the temperature-controlled region R11. In the present embodiment, the boundary between the temperature-controlled regions R11 and R12 is located such that the temperature-controlled region R3 of the upper mold, as viewed from above in the height direction Ds, overlaps the boundary between the temperature-controlled regions R11 and R12. The downstream end of the workpiece w has moved to a location where the temperature-controlled region R4 or R5, in the present embodiment, the temperature-controlled region R5, of the upper mold, as viewed from above in the height direction Ds, overlaps the downstream end of the workpiece w. In this state, as shown in FIG. 5B, the upper mold 1 is lowered to press the downstream end of the workpiece w and a portion of the workpiece w that is upstream of the downstream end. Specifically, the downstream end of the workpiece w is cooled by the temperature-controlled region R4 or R5 of the upper mold 1 and the temperature-controlled region R12 of the lower mold 2, and that portion of the workpiece w which is upstream of the downstream end is consolidated by the temperature-controlled region R3 of the upper mold 1 and the temperature-controlled region R11 of the lower mold 2. During this step, the middle portion of the workpiece w is located under the preheating region 1*a* and thus is preheated.

As described above, in each of the second and subsequent consolidation steps, the following processes take place simultaneously: the portion of the workpiece w that was consolidated in the previous consolidation step is cooled by the temperature-controlled region R4 or R5 of the upper mold 1; another portion of the workpiece w is consolidated by the temperature-controlled region R3 of the upper mold 1 in the current consolidation step; and yet another portion of the workpiece w that is to be consolidated in the next consolidation step is preheated by the temperature-controlled region R1 or R2 of the upper mold 1. In other words, the downstream heating region 1*b* of the upper mold 1 includes a consolidation heating region, i.e., temperature-controlled region R3, for consolidation of the workpiece w and cooling regions, i.e., temperature-controlled regions R4 and R5, for cooling of the workpiece w.

The lower mold 2 includes piping through which a cooling medium flows. For example, as shown in FIG. 3, air or water is used as the cooling medium, and the lower mold 2 is cooled by a water cooling technique in which the cooling medium is made to flow through the piping by means of a pump 41 under control of the control circuitry 10. Alternatively, as shown in FIG. 3, the cooling of the lower mold 2 may be effected by an air cooling technique using a fan 42, or the water cooling technique and the air cooling technique may be used in combination. When a portion of the workpiece w is cooled by the temperature-controlled region R4 or R5 of the upper mold 1 in the step of FIG. 5A, the lower mold 2 includes the temperature-controlled region R12 whose temperature has been adjusted by the cooling medium.

The proportions of the temperature-controlled region R12 and the temperature-controlled region R11 in the lower mold 2 are changed by the control circuitry 10. Specifically, in the present embodiment, where the temperature-controlled regions R4 and R5 of the upper mold 1 move relative to the lower mold 2 in the transfer direction Ds in conjunction with transfer of the workpiece w, the boundary between the temperature-controlled regions R11 and R12 is located such that the temperature-controlled region R3 of the upper mold, as viewed from above in the height direction Ds, overlaps the boundary between the temperature-controlled regions R11 and R12. Thus, whenever the temperature-controlled regions R4 and R5 of the upper mold are in contact with the workpiece w in the second and subsequent consolidation steps, the temperature-controlled regions R4 and R5 as viewed from above in the height direction Ds overlap the temperature-controlled region R12 of the lower mold. Thanks to this configuration of the present embodiment, transfer of the workpiece w and the steps of consolidation and cooling are accomplished only by the upper and lower molds 1 and 2 without the need for any structure specialized for transfer of the workpiece w. This allows for high time efficiency of molding of thermoplastic resin products. the temperature T12 of the temperature-controlled region R12 of the lower mold 2 is set to satisfy the relationship T11>T12. The temperature T12 may be set to, but is not limited to, a temperature ranging from about 50 to 150° C. below the melting point Tm of the workpiece w.

Figure 6:
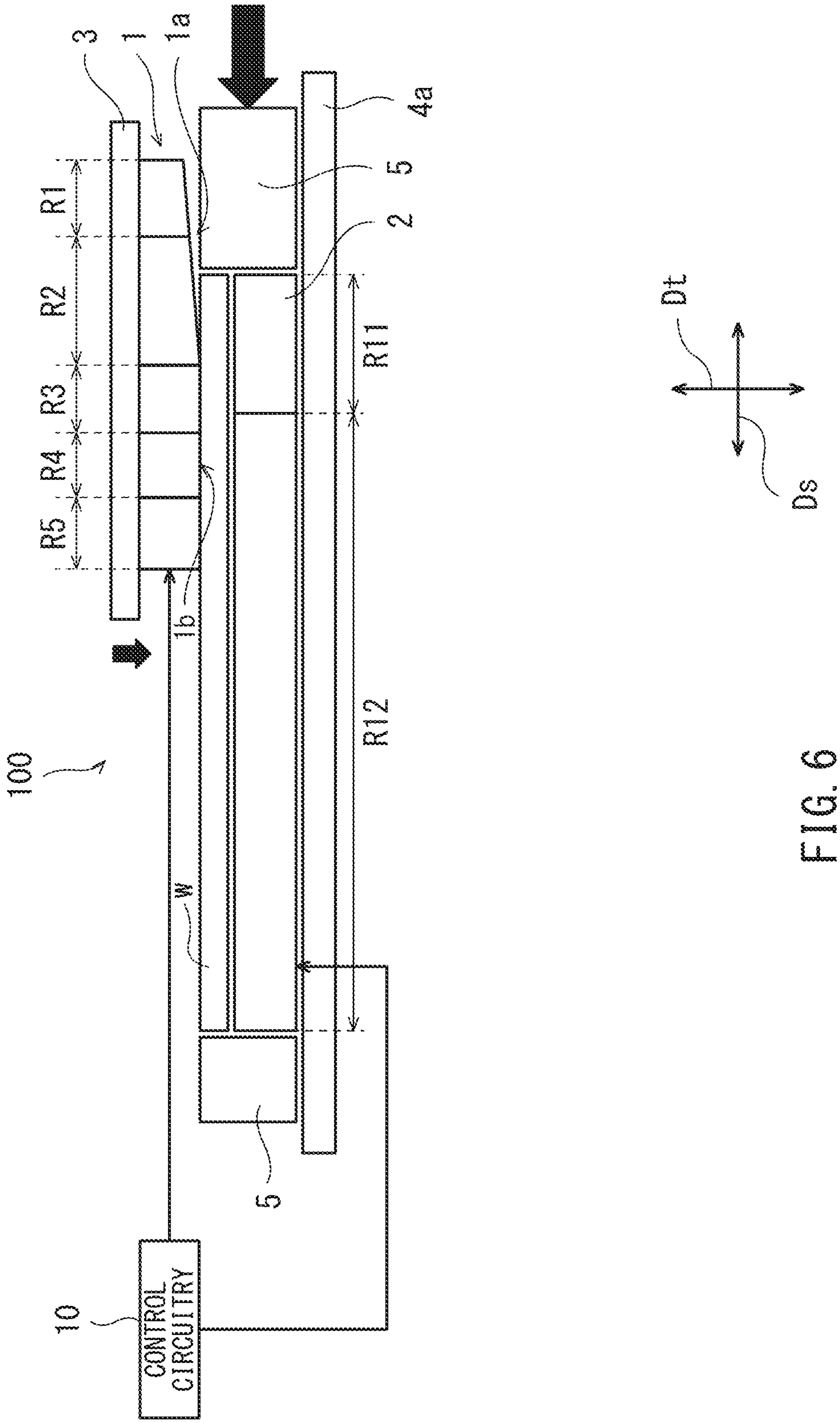
FIG. 6 is a view for explaining a third pressing step.

The above-described state of FIG. 5B is followed by movement of the base 4*a* in the transfer direction Ds, change of the proportions of the temperature-controlled regions R11 and R12 in the lower mold 2, and lowering of the upper mold 1 to establish the state as shown in FIG. 6. In the state of FIG. 6, the two steps as described with reference to FIG. 5B are carried out. After that, the two steps are repeated. Thus, the portion of the workpiece w that is to be consolidated by the upper and lower molds 1 and 2 shifts stepwise from the downstream end to the upstream end of the workpiece w. The whole process of molding the workpiece w using the molding device 100 of the present embodiment is completed once the upstream end of the workpiece w has been pressed and cooled in the second or any subsequent consolidation step.

As described above, with the use of the molding device 100 of the present embodiment, different portions of the workpiece w that are adjacent to one another in the transfer direction Ds can be simultaneously subjected to different processes including preheating, consolidation, and cooling in one pressing step performed on the workpiece w by the upper and lower molds 1 and 2, and the pressing step can be repeated in succession while moving the workpiece w in the transfer direction Ds.

Figure 7:
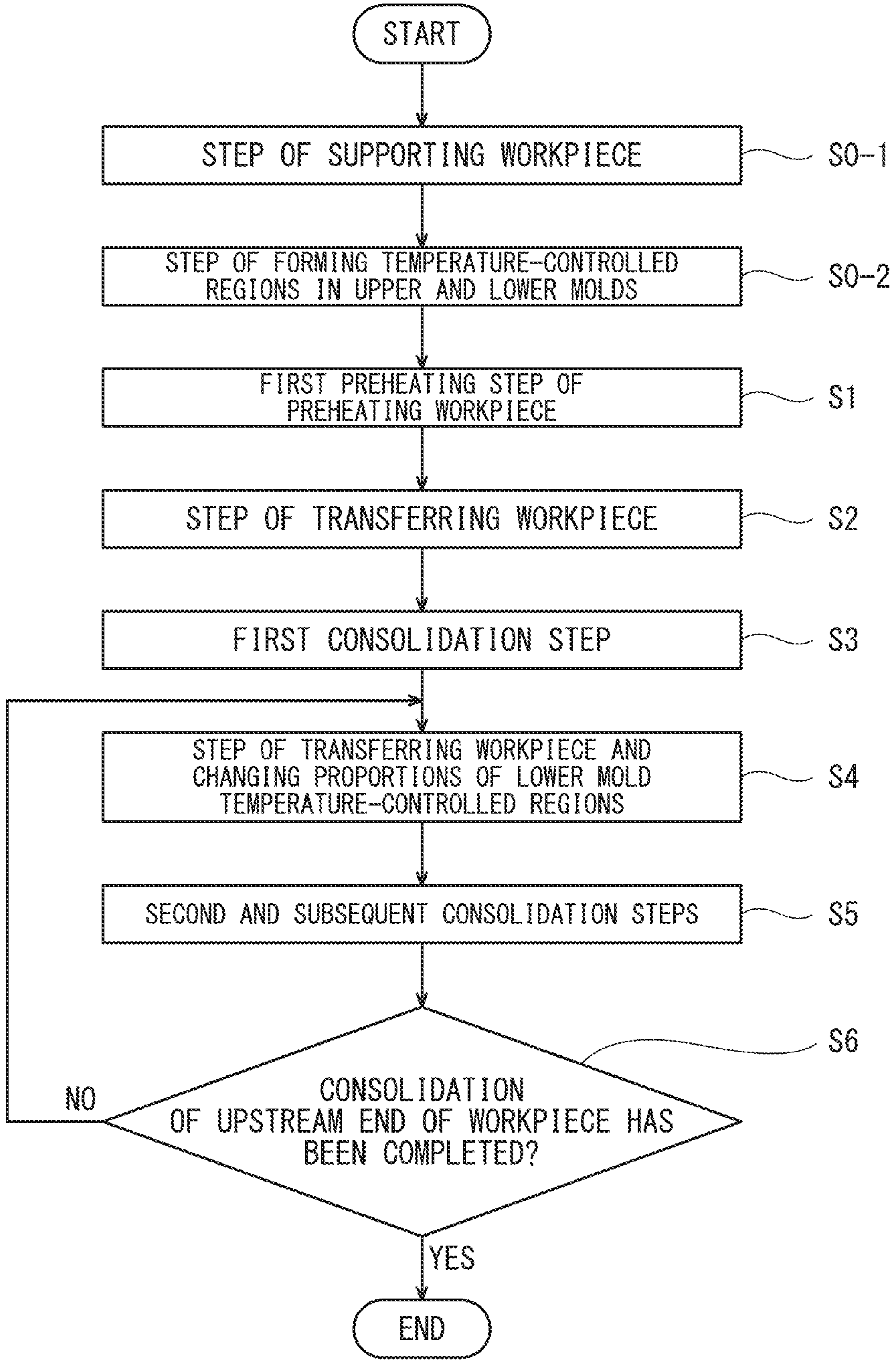
FIG. 7 is a flowchart showing the flow of a molding process using the molding device of the present embodiment.

FIG. 7 is a flowchart showing the flow of the molding process using the molding device 100 of the present embodiment.

As shown in FIG. 7, the workpiece w is supported by the lower mold 2 in a preliminary step (step S0-1). After that, the control circuitry 10 operates to form the temperature-controlled regions R1 to R5 in the upper mold 1 and form the temperature-controlled region R11 in the lower mold 2 (step S0-2). These preliminary steps are followed by the main steps described below.

First, the workpiece w is subjected to the first preheating (step S1). Next, the workpiece w is moved a predetermined distance in the transfer direction Ds (step S2). This movement is followed by the first consolidation step (step S3). In the first consolidation step, the portion of the workpiece w that was preheated in step S1 is consolidated, and at the same time preheating is performed on another portion of the workpiece w that is upstream of the portion being consolidated in the transfer direction Ds.

Next, the workpiece w is transferred, and the proportions of the temperature-controlled regions R11 and R12 of the lower mold in the transfer direction Ds are changed (step S4). Before step S4, the proportion of the temperature-controlled region R12 to the temperature-controlled region R11 is zero. The temperature-controlled region R12 is formed when step S4 is performed for the first time. Step S4 is repeated a number of times. The proportion of the temperature-controlled region R12 to the temperature-controlled region R11 increases with repeated step S4.

Next, the second and subsequent consolidation steps are performed (step S5). In step S5, cooling of a portion of the workpiece w that was consolidated in step S4, consolidation (pressing) of another portion of the workpiece w that was preheated in step S4, and preheating of yet another portion of the workpiece w that is upstream of the portion being consolidated in the transfer direction Ds, are all effected simultaneously. After that, in case that the workpiece w still has a portion to be pressed (NO in step S6), the molding process returns to step S4. In a case that the workpiece w no longer has any portion to be pressed (YES in step S6), the molding process ends.

In the molding device 100 of the present embodiment, the lower mold 2 supporting the workpiece w is moved by the transferer 4 relative to the upper mold 1 in the transfer direction Ds. Thus, different portions of the workpiece w that are adjacent to one another in the transfer direction Ds are pressed sequentially in the transfer direction Ds. This makes it possible to achieve the desired molding of a large-sized workpiece or a workpiece with a varying cross-section by individually pressing different portions of the workpiece that are adjacent to one another in the transfer direction. Additionally, in the lower mold 2, the first and second temperature-controlled regions R11 and R12, whose temperatures are controlled, are formed adjacent to each other in the transfer direction Ds. Furthermore, every time the lower mold 2 is transferred, the proportion of the temperature-controlled region R12 of the lower mold 2 to the temperature-controlled region R11 of the lower mold 2 in the transfer direction Ds is changed as a function of the relative position between the upper and lower molds 1 and 2. That is, as the lower mold 2 is moved downstream, the temperature-controlled region R11 narrows and the temperature-controlled region R12 broadens. This eliminates the need to use any specialized structure for transfer in the molding device 100 in which the pressing process by the upper and lower molds 1 and 2 is performed on different portions of the workpiece w in order from the downstream end to the upstream end of the workpiece w. Furthermore, unlike the case where the workpiece w is molded while maintaining the entire lower mold 2 at a uniform temperature, every pressing process performed by the upper and lower molds 1 and 2 is followed by cooling of the pressed portion of the workpiece w. This allows for shortening of the production time and cost reduction of the device.

In the present embodiment, the upper mold 1 includes temperature-controlled regions adjacent to one another in the transfer direction Ds, and the temperature-controlled regions include, in order from upstream to downstream in the transfer direction Ds, the preheating region 1*a* and the downstream heating region 1*b* having a temperature lower than that of the preheating region 1*a*. The preheating region 1*a* permits preheating of the workpiece w prior to press molding. The downstream heating region 1*b* permits consolidation of the workpiece w. Thus, in one pressing step performed by the upper and lower molds 1 and 2, different portions of the workpiece w can be subjected simultaneously to different processes; specifically, one portion of the workpiece w is preheated, and at the same time another portion of the workpiece w is subjected to consolidation in which the workpiece w is pressed at a temperature lower than the preheating temperature.

In the present embodiment, the downstream heating region 1*b* includes temperature-controlled regions adjacent to one another in the transfer direction Ds, and the temperature-controlled regions include, in order from upstream to downstream in the transfer direction Ds, the temperature-controlled region 3 which is a consolidation heating region and the temperature-controlled regions R4 and R5 which are cooling regions each of which has a temperature lower than that of the temperature-controlled region R3. Unlike the case where the entire downstream heating region 1*b* has a uniform temperature, cooling for lowering the temperature of the workpiece w can be effected during the pressing step as described above. This contributes to further shortening of the production time.

In the present embodiment, the control circuitry 10 controls the temperature of the preheating region 1*a* of the upper mold 1 to a temperature equal to or higher than the melting point Tm of the workpiece w and controls the temperature of the downstream heating region 1*b* of the upper mold 1 to a temperature lower than the melting point of the workpiece w. By changing the temperatures of the preheating region 1*a* and the downstream heating region 1*b* according to parameters related to the workpiece w, one molding device 100 can be adapted for production of different kinds of molded products. For the same purpose, the control circuitry 10 further controls the temperatures of the temperature-controlled regions of the lower mold 2 to temperatures equal to or higher than the temperature of the downstream heating region of the upper mold 1 and lower than the melting point Tm of the workpiece w.

In the present embodiment, the molding device 100 is configured such that the preheating region 1*a* is located away from the workpiece w when the workpiece w is pressed by the upper and lower molds 1 and 2. Specifically, the preheating region 1*a* has a smaller thickness than the downstream heating region 1*b* in order to be located away from the workpiece w when the downstream heating region 1*b* is pressed against the workpiece w. The temperature-controlled regions of the downstream heating region 1*b* are set to temperatures lower than those of the temperature-controlled regions of the preheating region 1*a*. In other words, the thickest region of the upper mold 1 is set to a temperature lower than those of the other thinner temperature-controlled regions of the upper mold 1. In thermoplastic resin molding, preheating is preferred in which the temperature of the material is increased slowly over a certain period of time. If preheating involves bringing a hot mold into contact with the workpiece w, the workpiece w is rapidly heated and could suffer a molding defect such as heat-induced cracking or deformation. Thus, the upper mold 1 of the present disclosure is shaped as described above to perform preheating in a non-contact manner.

(Variants)

The present disclosure is not limited to the above embodiment, and various modifications as described below may be made without departing from the gist of the present disclosure.

Figure 8A:
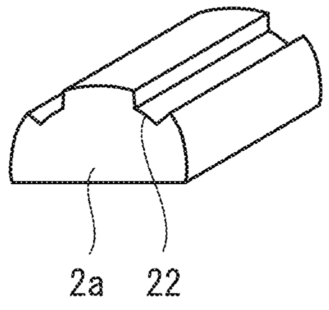
FIG. 8A is a perspective view of a lower mold.
Figure 8B:
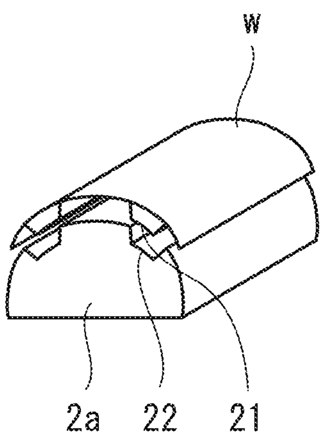
FIG. 8B is a perspective view showing a stringer located facing the lower mold of FIG. 8A.
Figure 8C:
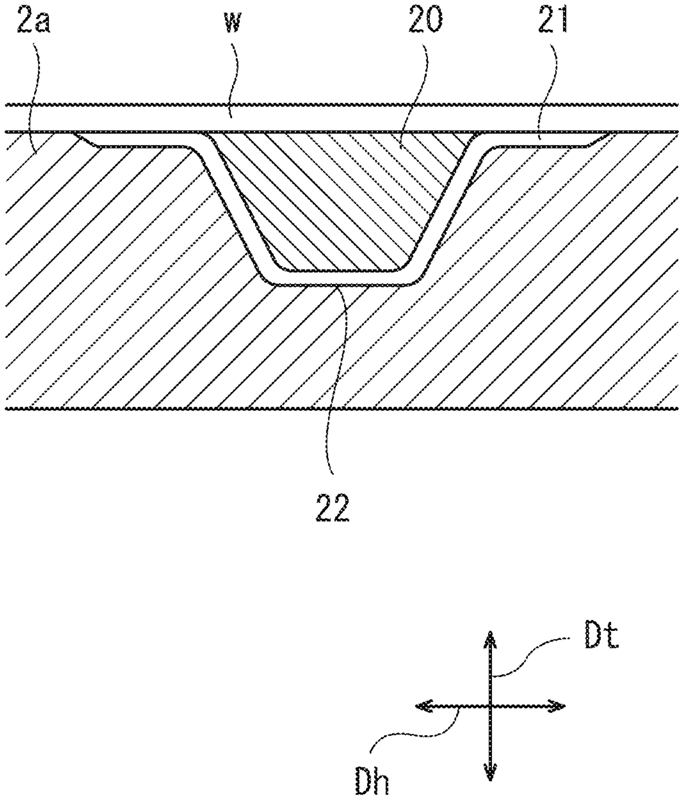
FIG. 8C is a cross-sectional view showing the stringer located facing the lower mold.

As shown in FIGS. 8B and 8C, the molding device 100 can mold a workpiece w which, for example, includes a stringer 21 having a hat-shaped cross-section and located on that surface of the workpiece w which is to be molded by a lower mold 2*a*. In this case, the stringer 21 is placed in a recess 22 formed in the lower mold 2*a*, and then a core 20 is inserted into a recess of the stringer 21. Subsequently, the workpiece w is placed along the surfaces of the lower mold 2*a* and the core 20 and molded in the same manner as in the embodiment described above. The temperature of the lower mold 2*a* is set to a temperature lower than the melting point of the stringer 21, and equal to or higher than the temperature of the downstream heating region 1*b*. The workpiece w and the stringer 21 are molded as one piece. The core is removed after the one-piece molding. Although in this example the stringer 21 is located on the surface of the workpiece w that faces the lower mold 2*a*, the present disclosure encompasses a configuration where a stringer is located on the surface of the workpiece w that faces the upper mold 1. In such a case, the recess 22 is formed in the upper mold 1.

Figure 9B:
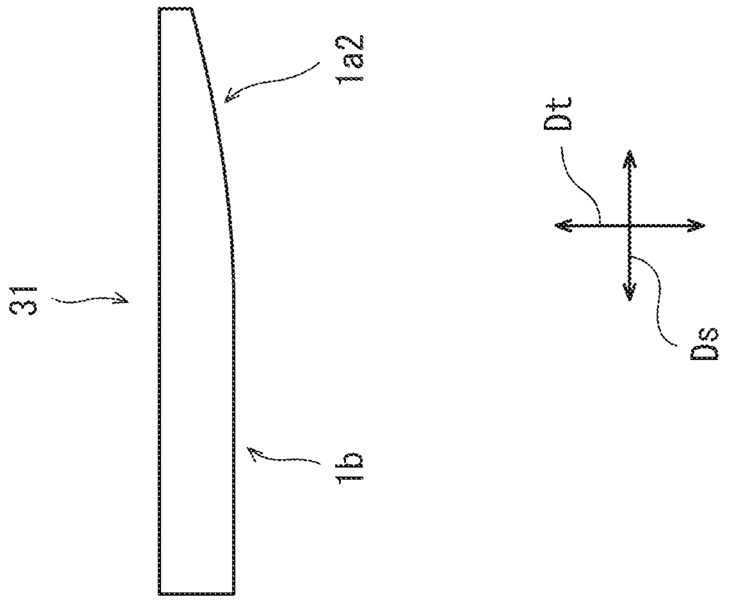
FIG. 9B shows another variant of the preheating region.
Figure 9A:
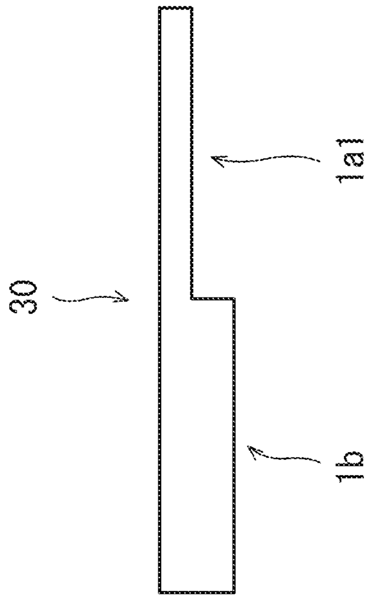
FIG. 9A shows a variant of a preheating region.

Although the above embodiment has been described using an example where the upper mold 1 includes the preheating region 1*a* including an inclined surface that faces the workpiece w, the present disclosure is not limited to this example. An upper mold 30 may be used which, as shown in FIG. 9A, includes a preheating region 1*a*1 that includes a horizontal surface extending over a part or the whole of its length and that is divided from the downstream heating region 1*b* by a stepped portion. Alternatively, an upper mold 31 may be used which, as shown in FIG. 9B, includes a preheating region 1*a*2 including a curved surface. In the case where there is a stepped portion at the boundary between the downstream heating region 1*b* and the preheating region 1*a*, the workpiece w subjected to pressing could have an undesired mold mark attributed to the stepped portion. Thus, it is preferable for the downstream heating region 1*b* and the preheating region 1*a* to be smoothly connected by an inclined surface or a curved surface.

Although the device of the above embodiment is configured such that the lower mold 2 is moved by the transferer 4 in the transfer direction Ds to effect relative movement between the lower mold 2 and the upper mold 1 in the transfer direction Ds, the present disclosure is not limited to this configuration. The upper mold 1 may be moved in the transfer direction Ds, or both the upper mold 1 and the lower mold 2 may be moved. Although in the above embodiment the upper mold 1 is moved in the height direction Dt at the time of consolidation, the relative movement in the height direction Dt may be effected by moving the lower mold 2 or by moving both the upper mold 1 and the lower mold 2. In the present disclosure, the relative movement between the upper mold 1 and the lower mold 2 in the different directions may be effected by any means or mechanism.

In the above embodiment, the upper mold 1 and the lower mold 2 do not move relative to each other in the width direction Dh. In the case where the relative movement in the width direction Dh is desired for any reason, the upper mold 1 and the lower mold 2 may be configured to move in the width direction Dh. For example, the upper mold 1 and the lower mold 2 may be configured such that in molding of a workpiece including a stringer extending in the height direction Dt and in the width direction Dh, relative movement between the upper mold 1 and the lower mold 2 is effected in the height direction Dt and the width direction Dh simultaneously to avoid contact of the stringer with the upper mold 1 or lower mold 2 before and after consolidation performed by the upper mold 1 and the lower mold 2 in a manner as described in the above embodiment.

As described above, the device and method of the present disclosure are suitable for use in production of parts of a relatively large machine such as an aircraft. The device and method of the present disclosure are also applicable to production of parts used in various other products and made of thermosetting resin. Although the workpiece in the above embodiment is a carbon fiber-reinforced thermoplastic resin product, the device and method of the present disclosure can be used, for example, for molding of a thermoplastic resin product reinforced with glass fibers or molding of a thermoplastic resin product that is not reinforced with any fibers.

Many modifications and other embodiments of the present disclosure will be apparent to those skilled in the art from the foregoing description. Accordingly, the foregoing description is to be construed as illustrative only, and is provided for the purpose of teaching those skilled in the art the best mode for carrying out the disclosure. The details of the structure and/or function may be varied substantially without departing from the scope of the disclosure.

What is claimed is:

1. A molding method for molding a workpiece by using heated upper and lower molds while transferring the workpiece in a transfer direction, the molding method comprising:

heating the upper mold to a first predetermined temperature, the upper mold includes temperature-controlled regions adjacent to one another in the transfer direction, wherein at least one of the temperature-controlled regions has a flat bottom surface and at least one other of the temperature-controlled regions has a straight inclined bottom surface;

heating the lower mold to a second predetermined temperature;

preheating the workpiece by the upper mold;

first moving the lower mold, which supports the workpiece, relative to the upper mold in the transfer direction;

pressing the workpiece by the upper mold;

moving the upper mold away from the workpiece and second moving the lower mold relative to the upper mold in the transfer direction; and controlling respective temperatures of each temperature-controlled regions of the upper mold to be in descending order from upstream to downstream in the transfer direction.

2. The molding method according to claim 1, wherein in the first moving and the second moving of the lower mold relative to the upper mold in the transfer direction, a temperature of the lower mold in contact with the pressed workpiece is lowered below a temperature that the lower mold had during the pressing of the workpiece.

3. The molding method according to claim 1, wherein the upper mold has five temperature-controlled regions.

4. The molding method according to claim 1, wherein a temperature of the lower mold is detected by a temperature sensor.

5. The molding method according to claim 4, wherein the temperature sensor is a thermocouple.

6. The molding method according to claim 4, wherein the temperature sensor is an infrared camera.

7. The molding method according to claim 1, wherein a length of the lower mold is 2500 mm.

8. The molding method according to claim 1, wherein the upper mold has a preheating region and a downstream heating region, and the preheating region includes the at least one other of the temperature-controlled regions that has the straight inclined bottom surface, and the downstream heating region includes the at least one of the temperature-controlled regions that has the flat bottom surface.

9. The molding method according to claim 8, wherein the at least one other of the temperature-controlled regions that has the straight inclined bottom surface has two temperature-controlled regions.

* * * * *